G. W. Rawson,
Steam Cut Off.

Nº 70,743.    Patented Nar. 12, 1867.

Witnesses;
S. N. Piper
J. R. Snow

Inventor;
George W Rawson
by his attorney
R. H. Eddy

United States Patent Office.

GEORGE W. RAWSON, OF CAMBRIDGEPORT, ASSIGNOR TO HIMSELF AND MICHAEL HITTINGER, OF SOMERVILLE, MASSACHUSETTS.

Letters Patent No. 70,743, dated November 12, 1867.

---

IMPROVEMENT IN STEAM-ENGINE CUT-OFFS.

---

The Schedule referred to in these Letters Patent and making part of the same.

---

TO ALL PERSONS TO WHOM THESE PRESENTS MAY COME:

Be it known that I, GEORGE W. RAWSON, of Cambridgeport, in the county of Middlesex, and State of Massachusetts, have invented a new and useful Variable Cut-Off for Steam Engines; and do hereby declare the same to be fully described in the following specification, and represented in the accompanying drawings, of which—

Figure 1:
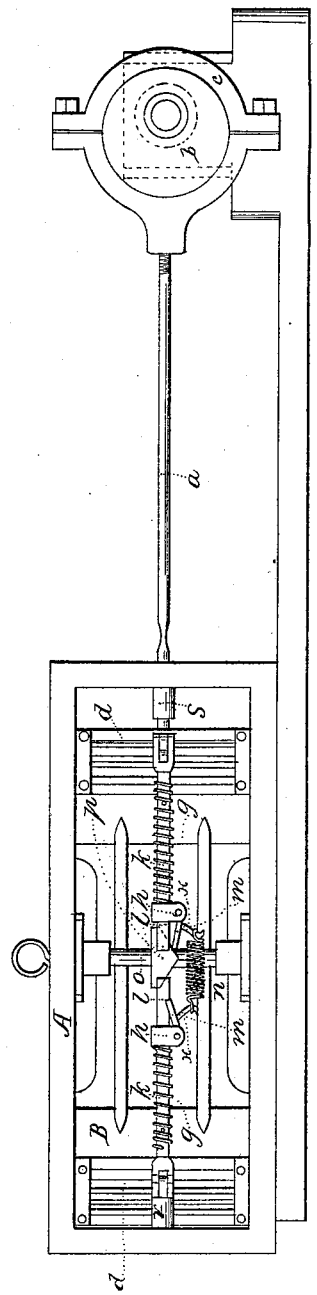

Figure 1 exhibits an elevation of a slide-valve, and the interior of a steam-chest, as provided with my invention.

Figure 2:
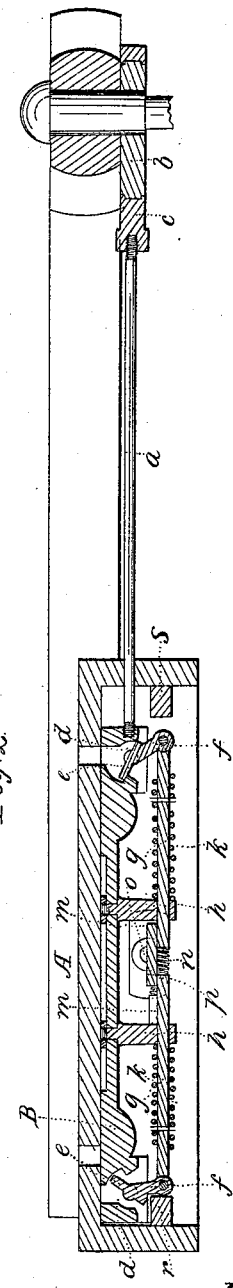

Figure 2 is a longitudinal and horizontal section of the same.

In such drawings, A denotes the steam-chest, and B the slide-valve thereof. Such steam-chest is to be furnished with ports of induction and eduction, and to be applied to a steam-engine cylinder in the ordinary way. The slide-valve is arranged on its seat, and is to be moved back and forth by a rod, $a$, connected with an eccentric, $b$, by a collar, $c$, extending around such eccentric. The valve has two gate-ways, $d\ d$, leading through it, there being a gate, $e$, arranged in each of them, and applied so as to revolve on an axis going lengthwise through its middle, each gate having journals at its opposite ends. An arm, $f$, projecting from each gate, is hinged to one of two bars, $g\ g$, which are supported by, and so as to be capable of sliding lengthwise in two projections, $h\ h$, extended from the slide-valve. Encompassing, and attached to each of the rods or bars $g\ g$, is a helical spring, $k$, which, by pressure against the adjacent projection $h$, operates to move the bar in a manner to cause its gate to close the aperture $d$ containing the gate. Furthermore, each of the slide-bars $g$ has a notch, $l$, for the reception of one of two pawls or latches, $m\ m$, which are hinged to the two projections $h\ h$, and are connected by a spring, $n$, affixed to arms $X X$, projecting from the said pawls. Between the two pawls, and fixed to a vertical slide-rod, $o$, is a pawl-tripper or cam, $p$, whose two lower edges are arranged at an obtuse angle with each other. The rod $o$ of the pawl-tripper is to be so applied to a "ball-governor" as to be raised and lowered by it, the same being so that as the speed of the engine or governor may increase, the pawl-tripper may be depressed, and *vice versa*. Two studs, $r\ s$, project from opposite ends of the steam-chest, and in range with the slide-bars of the two gates. When the slide-valve may be moving in a direction toward either of the studs $r\ s$, the arm of one of the gates will be forced against such studs, so as to cause the gate to turn and open the aperture $d$, in which it may be, the gate being held open by the next adjacent pawl catching into the notch of the slide-bar of such gate. During the next movement of the slide-valve in the opposite direction, the pawl last mentioned will be carried against the tripper, and will be forced out of the notch thereby, so as to enable the gate to be closed by the action of the spring. In this manner the gates will be alternately opened and closed, the closing of each being effected sooner or later, as the position of the tripper may be varied by the governor. Each gate of the cut-off is a balanced one, by reason of the steam acting with a like pressure on opposite sides of the axis of the valve.

I claim the combination of the slide-valve, the two gates, their openings and mechanisms, substantially as described for operating such gates in manner as specified.

I also claim the said mechanism or combination, substantially as described for operating the gates of the slide-valve through the agency of a governor, and the mechanism for producing the longitudinal movements of the slide-valve, such mechanism or combination first mentioned consisting of the tripper $p$, the notched slide-bars $g\ g$, the pawls or catches $m\ m$, the springs $k\ k$, the arms $f\ f$, and the studs $r\ s$, the whole being arranged and applied to the steam-chest and the slide-valve, substantially in manner and so as to operate as hereinbefore specified.

GEORGE W. RAWSON.

Witnesses:
R. H. EDDY,
F. P. HALE, Jr.